United States Patent Office 3,080,002
Patented Mar. 5, 1963

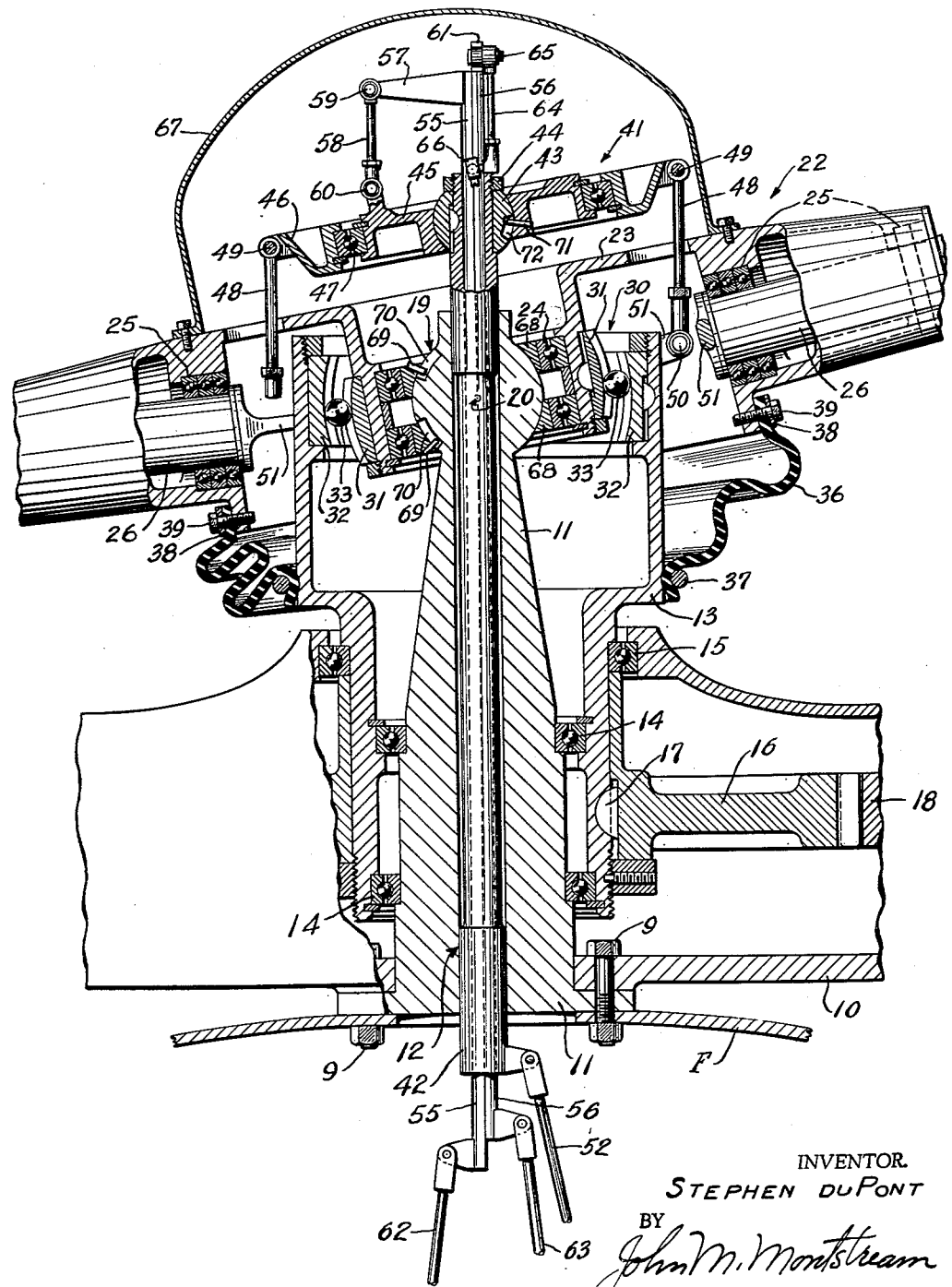

3,080,002
ROTOR WITH FIXED PYLON
Stephen du Pont, Southbury, Conn., assignor to Doman Helicopters Inc., Danbury, Conn., a corporation of Delaware
Filed June 29, 1961, Ser. No. 120,746
10 Claims. (Cl. 170—160.26)

The invention relates to a rotor for a self sustaining aircraft, such as a helicopter, having a pylon fixed to the fuselage and a separate drive shaft. The rotor head of the rotor is mounted on the pylon for rotation and tilt. With a fixed pylon, the stress thereon is solely a bending stress which remains unchanged over relatively long periods whereas a rotating pylon has both a bending and a torque rotating bending stress which is continuously changing once for each revolution of the head which results in greater or more rapid fatigue. The drive shaft is tubular and surrounds the fixed pylon. The swash plate means for blade pitch change is above the rotor with control or adjusting member or members therefor passing through the fixed pylon. The control member may be solely a collective control for an equal change of the pitch of all blades or may also include controls for change of the tilt of the swash plate and hence control cyclic change of pitch of the blades. The rotor may be of large size for the main or lift rotor or of small size for the tail rotor. Usually, though not necessarily, the main or lift rotor has both collective and cyclic control of the blades and a tail rotor usually need be provided solely with collective pitch control.

It is an object of the invention to construct a rotor with a fixed pylon and the drive shaft or tube exterior of the pylon, so that the pylon is subjected solely to bending stress.

Another object of the invention is as above and in addition provides a swash plate means above the rotor head.

Another object is to construct a rotor head which can be driven from a drive shaft either by an axially flexible boot or housing or a constant velocity universal joint or by both.

A still further object is as in the preceding paragraph and the drive may be selected without any change in the rotor construction other than the elimination of one drive connection.

Other objects of the invention will be more apparent from the following description when taken in connection with the accompanying drawing illustrating a preferred embodiment thereof in which:

The FIGURE is a vertical section through the rotor.

The rotor has a gear box 10 and a pylon 11 which gear box and pylon are secured or fixed together and to the fuselage F such as by bolts 9. The gear box and pylon form a base. The pylon has a central bore 12 therethrough. A tubular drive shaft 13 is rotatably mounted on the base such as by bearings 14 on the pylon and a bearing 15 on the gear box 10. A drive gear 16 is secured to the drive shaft such as by a key 17 and the gear may be driven by a suitable pinion 18 meshing therewith. The upper end of the pylon carries a pylon or rotor head universal joint of any suitable kind, that shown being a ball type having a sphere or portion of a sphere 19 with a center 20.

A rotor head is mounted on the pylon universal joint for tilting and rotation thereon. The rotor head 22 includes a rotor casing 23 having rotor bearings 24 tiltably mounted on the sphere 19. The rotor head, therefore, is rotatably mounted on the pylon and is free to change its tilt with respect to the pylon through the pylon universal joint. The rotor head carries blade bearings 25 which oscillatively mount the spar 26 of a blade on the spar axis and the longitudinal axis of the blade. A plurality of such blades are circumferentially spaced around the head. It is desirable that the spar axes when extended intersect the joint axis 20 or if the axis is offset to intersect a horizontal plane adjacent thereto.

A drive connection is provided between the drive shaft 13 and the rotor casing 23. Two such connections are illustrated, one of which is a universal joint 30 which should be a constant velocity joint including an inner ring 31 keyed to the rotor casing 23 and an outer ring 32 keyed to the drive shaft 13. Between the rings 31 and 32 is a plurality of balls 33. It is highly desirable that the universal joint 30 be located in a plane at right angles to the pylon and passing through the pylon universal joint 19.

A drive connection may be provided through an axially flexible tubular boot or housing 36 which is secured at one end to the drive shaft 13, such as by a clamping ring 37, and its other end is connected with the rotor casing 23 such as by a clamping ring 38 and bolts 39. The boot when it provides a part of or the sole driving connection between the drive shaft 13 and the casing 23 will be axially flexible and torque rigid so that the rotor head may tilt freely on the pylon and yet constant velocity or substantially a constant velocity rotating drive connection is secured. The constant velocity universal joint 30 may be removed and drive secured solely through the boot 36. If drive is desired solely through the constant velocity universal joint 30, the boot 36 may be merely a sealing boot without torque rigidity. Such a sealing boot is desirable so that the head may be oiled with an oil spray and also so that oil is not thrown on the blades to unbalance the same. It is clear that a driving connection may be established both through the constant velocity universal joint 30 and a torque rigid boot 36 if desired.

Swash plate means are provided above the rotor head for at least collective pitch change of the blades or for both collective pitch change and cyclic pitch change of the blades. Collective pitch change varies the pitch of all of the blades an equal amount. Usually a tail rotor has solely collective pitch change for its blades. The swash plate means includes a mast, shown as a mounting and control tube 42 passing axially through the bore 12 of the pylon. On the upper end of this mast or mounting tube, a swash plate universal joint is carried, shown particularly as a sphere 43 secured or fixed on the end of the tube such as by a nut 44 and key. A non-rotatable swash plate ring 45 is mounted on the universal joint or sphere 43 for tilt thereon. A rotating swash plate ring 46 is rotatably mounted on the non-rotatable swash plate ring by means of a bearing 47. A connection is provided between the swash plate ring 46 and each spar 26 of each blade to change the pitch of the blades. This connection includes a link 48 pivotally mounted on the ring 46 through a pivot 49 and the other end of the link is connected by a pivot 50 with a horn 51, one such horn being secured to the end of each blade spar 26. These horns, as is well known, extend 90 degrees or approximately 90 degrees circumferentially so that each link 48 is spaced 90 degrees circumferentially from the blade to which it is connected and the blade the pitch of which is controlled. If solely collective pitch of the blade is desired, the universal joint 43 may be dispensed with and the fixed swash plate ring 41 is fixed in a plane at right angles to the tube 42. By axial movement of the mast or tube 42 and thereby lifting or lowering the swash plate means through the operating rod 52, which is connected at the bottom of the mast or control tube 42, the position or elevation of the swash plate means with respect to the rotor head may be varied and in this manner vary the pitch of all blades an equal amount or collectively.

For a main or supporting rotor head, cyclic pitch control of the blades is also utilized. To provide cyclic pitch control, a universal joint mounting for the swash plate means is essential in order to tilt the same into any desired plane within its range. The cyclic pitch control means includes a pair of control rods 55 and 56 which pass up through the central bore of the control tube 42. These rods may conveniently be two half round rods. The control rod 55 carries an arm 57 at its upper end with which is connected a link 58 through a pivot 59 and the other end of the link is connected with the non-rotatable swash plate ring 45 by means of a ball pivot 60. The control rod 56 carries a similar arm 61 on the upper end thereof which arm is connected by a pivot 65 to one end of a connecting link 64. The other end of this link is connected by a ball pivot 66 to the non-rotatable ring 45 of the swash plate means. These connecting links are connected with the non-rotatable swash plate ring 45 spaced apart circumferentially at 90 degrees, one being at a fore and aft position of the aircraft and the other being at a lateral position so that any desired angular tilt of the swash plate may be secured within its tilt range. The control rod 56 is slidable axially within the mast or mounting and control tube 42 by means of an operating rod 62 and the control rod 56 is moved axially within the bore of the mast or control tube 42 through an operating rod 63. A cover 67 is secured to the rotor head over the swash plate means so that the entire rotor head is enclosed to retain oil therein and enable use of spray lubrication.

The cyclic pitch control is secured from the pilot's stick which is connected in known manner with the operating rods 62 and 63. The collective pitch operating rod 52 is usually connected with a separate pilot's collective pitch lever. The three connections or controls are customarily connected together by known mixing means so that movement of the collective pitch control tube to change collective pitch of the blades makes no change in any cyclic pitch control setting.

It is desirable that the inner races of the bearings 24 and the sphere rings 68 therefor do not rotate on the sphere 19 hence pins 69 are provided in these rings which extending into circumferential slots 70 in the sphere extending along a plane including the axis of the pylon. Likewise it is desirable that the non-rotatable swash plate ring 45 be secured against rotation on the mast sphere 43. A pin 71 is provided in this ring the end of which is received in a slot 72 in the sphere 43.

This invention is presented to fill a need for improvements in a rotor with fixed pylon. It is understood that various modifications in structure, as well as changes in mode of operation, assembly, and manner of use, may and often do occur to those skilled in the art, especially after benefiting from the teachings of the invention. This disclosure illustrates the preferred means of embodying the invention in useful form.

What is claimed is:

1. A rotor for a self sustaining aircraft to be mounted on a fuselage comprising a base including a non-rotatable pylon, the pylon having a bore therethrough, means carried by the base to fixedly secure the same to a fuselage, a pylon universal joint carried by the pylon; a rotor head having a plurality of blades uniformly spaced circumferentially and each blade having a longitudinal axis, and means mounting each blade for pivotal movement on the longitudinal axis of the blade; means rotatably mounting the rotor head on the pylon universal joint, a tubular drive shaft rotatably mounted on the base and around the pylon, means connected with the drive shaft to rotate the same, a drive connection between the drive shaft and the rotor head providing torque rigidity and tilting freedom for the rotor head, a non-rotatable swash plate mast slidably mounted in the bore of the pylon for axial adjustment and extending above the pylon, means connected with the mast to adjust the same, swash plate means carried on the swash plate mast above the pylon and rotor head and having a rotatable swash plate ring, and a connection for each blade between the rotatable swash plate ring and the blade to control the pitch of its blade.

2. A rotor as in claim 1 in which the drive shaft is around the pylon universal joint, and the drive connection for the rotor head is a constant velocity universal joint between the tubular drive shaft and the rotor head and located in a plane at right angles to the pylon and passing through the center of the pylon universal joint.

3. A rotor as in claim 1 in which the drive connection is an axially flexible and torque rigid housing.

4. A rotor as in claim 2 including an axially flexible housing between the tubular drive shaft and the rotor head and an enclosing cover carried by the top of the rotor head enclosing the same.

5. A rotor for a self sustaining aircraft to be mounted on a fuselage comprising a base including a pylon, the pylon having a bore therethrough, means carried by the base to fixedly secure the same to a fuselage, a pylon universal joint carried by the pylon; a rotor head having a plurality of blades uniformly spaced circumferentially and each blade having a longitudinal axis, and means mounting each blade for oscillatory movement on the longitudinal axis of the blade; means rotatably mounting the rotor head on the pylon universal joint, a tubular drive shaft rotatably mounted on the base and around the pylon, means connected with the drive shaft to rotate the same, a drive connection between the drive shaft and the rotor head providing tilting freedom for the rotor head, a non-rotatable tubular swash plate mast slidably mounted in the bore of the pylon for axial adjustment, a swash plate universal joint carried on the swash plate mast above the pylon and the rotor head; swash plate means mounted on the swash plate universal joint including a non-rotatable swash plate ring, a rotatable swash plate ring rotatably mounted on the non-rotatable ring, a pair of cyclic pitch rods slidably mounted in the swash plate mast for independent adjustment, a first connection between one cyclic pitch rod and the non-rotatable swash plate ring, a connection between the other cyclic pitch rod and the non-rotatable swash plate ring spaced 90° circumferentially from the first connection with the non-rotatable ring, and a connection for each blade between the rotatable swash plate ring and the blade to cyclically control the pitch of each blade.

6. A rotor as in claim 5 in which the drive shaft is around the pylon universal joint, and the drive connection for the rotor head is a constant velocity universal joint between the tubular drive shaft and the rotor head and located in a plane at right angles to the pylon and passing through the center of the pylon universal joint.

7. A rotor as in claim 5 in which the drive connection is an axially flexible and torque rigid housing.

8. A rotor as in claim 6 including an axially flexible housing between the tubular drive shaft and the rotor head and an enclosing cover carried by the top of the rotor head enclosing the same.

9. A rotor as in claim 2 in which the drive connection includes an axially flexible and torque rigid drive housing between the drive shaft and the bottom of the rotor head and sealing the same, and a cover carried by the rotor head enclosing the top thereof and the swash plate means.

10. A rotor as in claim 6 in which the drive connection includes an axially flexible and torque rigid drive housing between the drive shaft and the bottom of the rotor head and sealing the same, and a cover carried by the rotor head enclosing the top thereof and the swash plate means.

References Cited in the file of this patent

UNITED STATES PATENTS

| | | |
|---|---|---|
| 2,256,635 | Young | Sept. 23, 1941 |
| 2,264,943 | Larsen | Dec. 2, 1941 |
| 2,961,051 | Wilford et al. | Nov. 22, 1960 |

FOREIGN PATENTS

| | | |
|---|---|---|
| 1,004,417 | France | Nov. 28, 1951 |